UNITED STATES PATENT OFFICE.

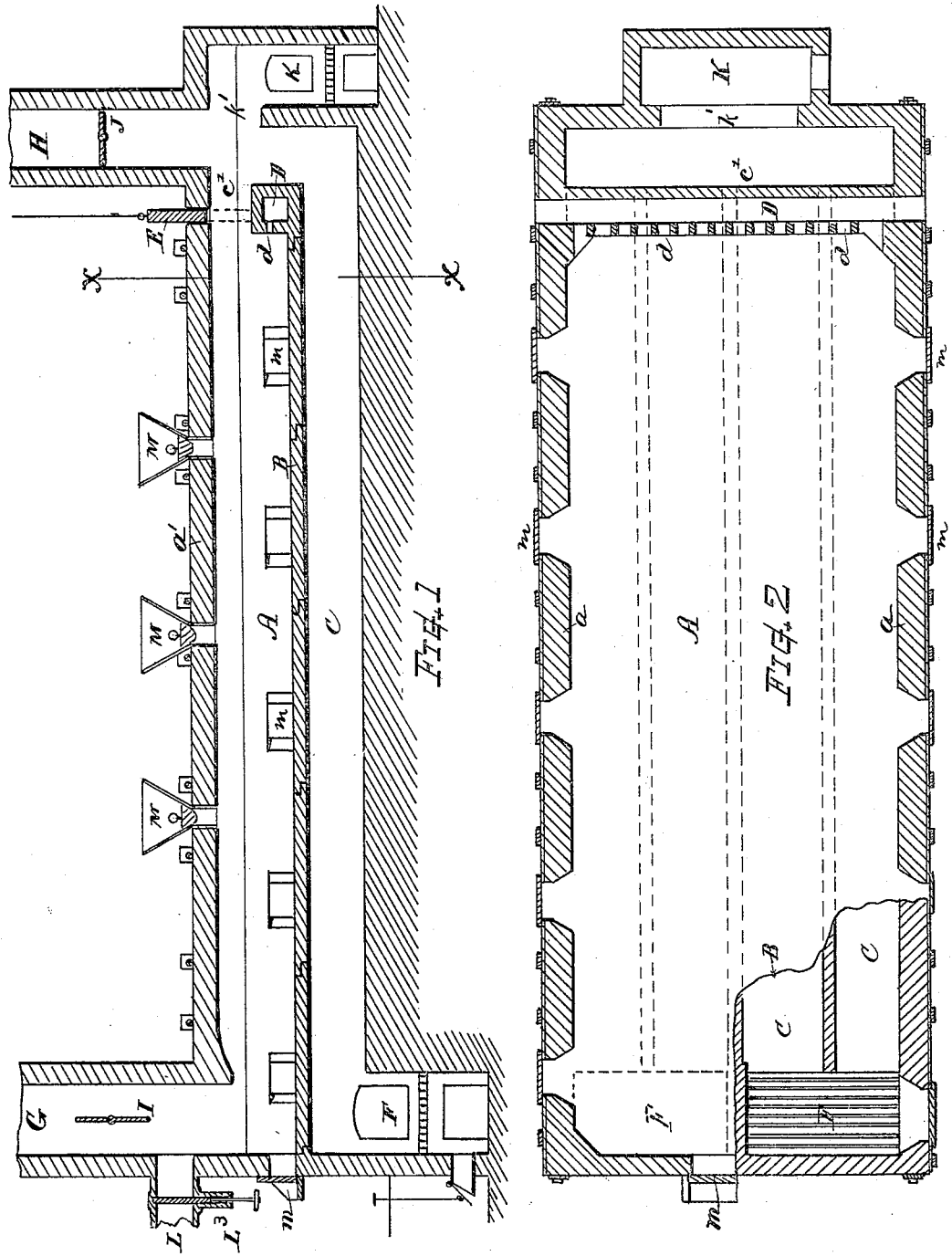

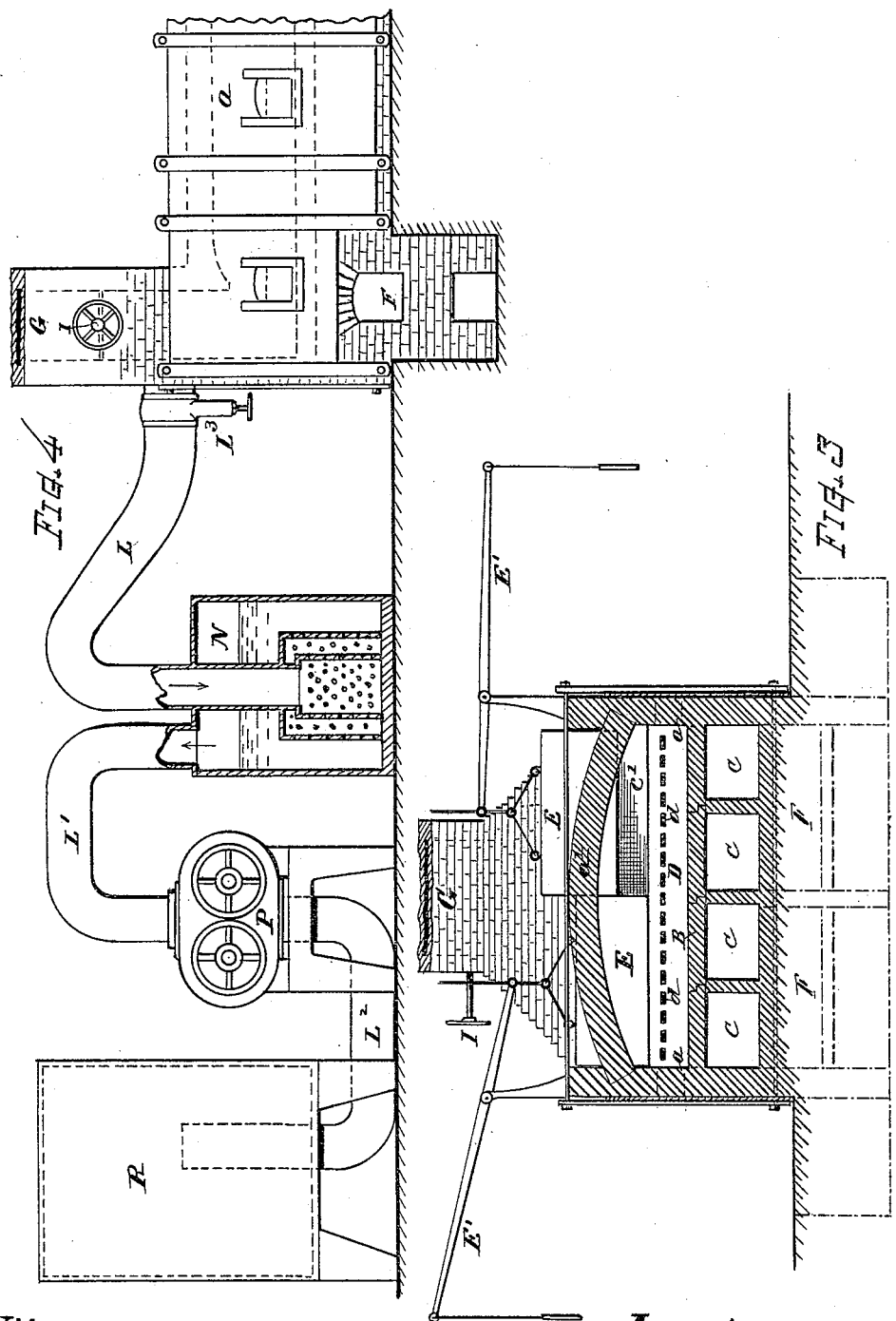

GEORGE M. RICE, 2D, OF WORCESTER, MASSACHUSETTS.

METHOD OF AND APPARATUS FOR THE TREATMENT OF ORES.

SPECIFICATION forming part of Letters Patent No. 511,800, dated January 2, 1894.

Application filed July 11, 1893. Serial No. 480,169. (No model.)

*To all whom it may concern:*

Be it known that I, GEORGE M. RICE, 2d, a citizen of the United States, residing at Worcester, in the county of Worcester and State of Massachusetts, have invented a new and useful Method of and Apparatus for the Treatment of Ores, of which the following, together with the accompanying drawings, is a specification sufficiently full, clear, and exact to enable persons skilled in the art to which this invention appertains to make and use the same.

The object of this invention is to afford a practical and convenient method whereby the chlorination or desulphurization of ores can be quickly and economically effected; also to afford a simple and efficient means of controlling the chemical reactions produced in chlorinating or desulphurizing furnaces, whereby the active effect on the material treated may be either chloridizing, oxidizing or reducing, and the time of the action hastened or retarded at will.

Another object is to separate the fire-gases from the chemical gases or fumes produced in the roasting of the ore, so that such chemical gases can be collected in a purer or more concentrated form than if allowed to mingle together with the fire-gases, thereby greatly facilitating the process of their condensation, and to save any gold, silver or other metal, or metals, or volatile salts of metals that may be formed in working the furnace.

These objects I attain by the means and operative treatment as hereinafter described; the particular subject-matter claimed being definitely specified.

In the drawings, Figure 1 is a longitudinal section of a furnace for treating ores, illustrating my invention. Fig. 2 is a horizontal section of the same. Fig. 3 is a transverse vertical section at line $x\ x$ on Fig. 2, and Fig. 4 is an elevation view illustrating an apparatus for condensing the gases and fumes as employed in connection with the furnace.

For carrying out my invention the furnace is constructed substantially as shown; and comprises a reverberatory chamber A inclosed by suitable walls $a$ and roof arch $a'$, and having a bed or hearth B upon which the ore is placed for treatment. Beneath this hearth B is arranged a fire-box, or boxes, F, preferably at the front end, with a chamber or fire-passage C extending therefrom along the under side of the hearth to its opposite end where said fire-passage communicates with the upper chamber by a fire-way $c'$. Across the chamber A at this fire-way, and on the end of the hearth, I arrange a hollow bridge wall or barrier D containing within it an air flue from which a series of air inlets or delivery holes $d$ open into the chamber A above the hearth or ore bed in a row extending across the width of the furnace chamber.

Two chimneys or uptake stacks G and H are arranged in connection with the furnace, one, G, leading out from the end of the chamber A, and the other, H, leading up from the fire-way which approaches the bridge wall D. In each of these chimneys I provide a stop-gate or shut-off plate I and J, by which the uptake flue can be closed or controlled to send the fire gases through either of the stacks for the purpose hereinafter described.

Above or adjacent to the hollow bridge D, and transversely across the fire-way, I provide a shut-off gate, or gates, E, whereby the fire-way $c'$ leading into the chamber A can be completely closed so as to exclude the fire gases from the ore chamber, or opened to admit the fire thereinto at will. Said gates are preferably arranged as shown to move up and down in a suitable recess formed in the roof or crown-arch, and levers E' or other suitable lifting devices are connected therewith by which said shut-off gates can be conveniently operated (see Fig. 3) for closing off the fire passages from the chamber A, or the admission of the fire-gases thereto at will, thus instantly converting the reverberatory furnace into a muffle furnace or vice versa, and perfectly controlling the action of the furnace in treating ores.

An auxiliary fire-box K is preferably arranged at the rear end of the furnace having a fire-passage $k'$ that communicates with the fire-way $c'$ and the chimney H, as indicated in Fig. 1.

Doors $m$ are arranged at the sides of the chamber A, in usual manner, to facilitate rabbling the ore on the hearth; and the usual openings and hoppers M are provided in the roof for the introduction of the ore to the chamber A.

L indicates a pipe or conductor which is connected with the end of the chamber A, or its chimney G below the stop-gate I for conducting the gases or fumes that are thrown off from the ore under treatment into a condenser N located at a convenient position and communicating by pipe L' with an exhauster or pumping mechanism P adapted for inducing a positive flow of the gases therethrough; and R indicates a chamber for receiving and collecting uncondensed gases that pass from the pump P thereinto through the pipe $L^2$. The conductor L is provided with a stop-gate $L^3$ near the furnace. The details of the separate appliances employed in this condensing apparatus can be of any suitable well known structure, such details not being essentials of my present invention.

By my improved method the ore is subjected to the action of fire until the sulphur contained in the ore is in a state of combustion. Then the fire is excluded from the ore; but atmospheric air is supplied thereto and the resultant fumes or gases, thus separate from the fire-gases are exhausted from the ore through a suitable condenser that retains the hydrochloric acid and condenses the volatilized metals, recovering the same in a comparatively pure form and in a much more concentrated condition than can be attained when the entire fire-gases pass with the fumes and chemical gases to the condensing apparatus, as heretofore practiced.

The operation of my invention is as follows:—The furnace is primarily fired until the hearth B is brought to the proper heat, the passage of stack H being closed and the stack G open. The pulverized ore is then introduced through openings M and spread upon the roasting hearth and the fire heat introduced into the chamber A from the fire-places F through the way $c'$; the firing being continued until the sulphur in the ore is in an active state of combustion. The cut-off I is then closed and the cut-off J is opened causing the fire-gases to pass up the stack H, so that only atmospheric air is admitted to the chamber A through the openings $d$ of the bridge D. The heat beneath the hearth B is maintained, however, by the fire from the fire-box F passing through the spaces C. The cut-off I is now closed and the gate $L^3$ of the conductor leading to the condenser N is opened. The exhauster P is set in motion and the acid fumes given off from the ore undergoing treatment, without the fire-gases, are drawn through the condenser N. Air heated by contact with the hot brickwork of the bridge D is continually supplied through the openings $d$. The oxygen of the air not being contaminated with fire gases enters into active combination with the sulphur in the ore, producing sulphurous and sulphuric acid gases, which in part combine with the oxides of the metals as produced, but the major part, however, passes off as gases to the condenser through the conductor L. In practice, when the material is intended for chlorination, the ore is mixed as usual with common salt or other suitable chemicals that will afford chlorine and treated in the furnace as before described. When salt is used, the sulphuric acid gases produced react upon and decompose the salt mixed with the ore, liberating chlorine and hydrochloric acid gases, which in turn combine with the oxides of the metals with great energy, according to the well known chemical reaction. At the same time a surplus of acid fumes are generated which can be saved in the condenser in the form of acid liquor for subsequent use. The ore is rabbled at frequent intervals so as to present fresh surfaces to the combined action of the heat, air, and chemical gases. The heat maintained in the fireplace F, beneath the ore hearth together with the heat generated by the chemical reactions in the ore is, in most instances, sufficient to finish the working of the charge; but if found deficient the cut-off gates E are opened and fire of the fireplace is thrown into the ore-chamber A until the heat is brought up to the desired degree. The cut-offs E may then be again closed as before.

If it is desired to augment the heat of the furnace at any stage of the process then fire in the auxiliary fire-box K can be started and raised to such degree as may be required; the fire-gases therefrom, when the gate J is closed, passing directly over the bridge D into the chamber A, together with the fire-gases from the passages C beneath the hearth.

In the chlorination of ores, if the ore is combined with considerable sulphur, say fifteen per cent. or upward, then the oxidizing of the sulphur will usually give sufficient heat (the fire beneath the hearth of course assisting) for carrying the action to final completion without further admission of fire-gases to the chamber A; but with ores that are low in sulphur it may be necessary or desirable to shift the cut-off gates and throw the fire-gases onto the ore for a greater or less time near the final stage of treatment in order to counteract the tendency of the mass to drop to too low a temperature as the proportion of oxidizable sulphur becomes exhausted. For desulphurizing the ore to a complete or "dead roast" this subsequent admission of the fire-gases, after the oxygen or air treatment, is in all cases essential, and is effected at that stage of the process when the ore commences to show indication of becoming cooled, or its inherent combustible to become exhausted. By this method of treating the ore in the furnace described, from twenty-five to fifty per cent. is saved in the time required to treat a charge of ore, and the conditions governing the working of the process being under control, more perfect and economical results are attained; more especially is this the case if the process is used for the purpose of chloridizing ores.

In a trial test of this process and apparatus on a sulphureted ore carrying four per cent. copper together with some gold and silver, the ore was mixed with a proper quantity of salt and treated as above described, and the charge was finished in three hours from the time it was let into the heated furnace. Substantially all of the copper was brought into a soluble condition as mixed chloride and sulphate, and was extracted by treatment with boiling water, and from the residue the gold was extracted by "barrel chlorination" and the silver recovered by leaching with hyposulphite of soda; the final residue showing but a trace of silver and no gold or copper. The acid liquor in the condenser afforded copper to the amount of one-tenth of one per cent. of the total weight of the ore, and strong traces of both gold and silver. All of these metals can be saved by adding the condenser liquor to the water used to leach out the copper, and at the same time any dichloride or oxide of copper formed in treating the ores is also brought into solution.

I claim as my invention herein, to be secured by Letters Patent—

1. The improvement in the process of treating ores, which consists in subjecting the ore in a suitable furnace first to the direct action of the fire-gases until the contained sulphur is brought into an active state of combustion, then cutting off the fire-gases therefrom and admitting atmospheric air independent of the fire-gases thereby continuing the heat with the burning sulphur in the ore, then exhausting the fumes and chemical gases from the ore through a condenser, while thus separate from the fire-gases, and condensing these chemical gases in their pure condition while the fire-gases are permitted to otherwise escape, substantially as set forth.

2. A furnace comprising in combination the ore-hearth with upper and lower chambers respectively above and below said hearth, the fire-box, and a fire-way connecting said chambers at the end of the hearth; the hollow bridge having air inlets that open therefrom into said upper chamber, two chimneys respectively leading from the furnace at opposite sides of said bridge, and each provided with a stop-gate that controls its passage, and the movable gate or shut-off controlling the fire-way over said bridge, for the purposes set forth.

3. An apparatus for desulphurization or chlorination of ores, substantially as set forth, comprising the reverberatory chamber having the ore hearth, the fire-box with fire-way passage leading into said chamber at the end of the hearth, two chimneys respectively disposed, one in connection with said chamber and one in connection with said fire-way passage, each chimney having an adjustable stop-valve therein, the movable shut-off gate between the fire-passage and said chamber, and a series of air-inlets that admit air into the chamber adjacent to said shut-off, for the purpose specified.

4. A furnace for the desulphurization and chlorination of ores, having a shut-off-gate between the ore chamber or bed and the furnace fire-passage, a series of air-inlets along the fire-way bridge suitable mechanism for operating said shut-off-gate, and means substantially as described for diverting the fire-gases while the ore is under treatment, in combination with a gas exhausting mechanism connected with said ore-chamber and a condenser receiving the fumes and chemical gases which are transferred by said exhausting mechanism from the ore-chamber unmixed with fire-gases, substantially as set forth.

5. The combination, with the ore-chamber having a chimney G with stop-gate I, the fire-box and fire-passage having a chimney H with stop-gate J, and fire-way $c'$ leading into said ore-chamber, of the gas-condenser N and exhauster P connected by conductor L L' with said ore-chamber, a movable shut-off-gate E separating the fire-passage and ore-chamber, and a series of openings for admitting air to said chamber, substantially as set forth, whereby the gases and fumes from the treated ore are concentrated and condensed without intermixture with fire-gases.

6. In an apparatus for the purpose specified, the combination with the ore-chamber A having the hollow bridge D with openings $d$, the fire-box F, fire passages C and chimney G, of the auxiliary fire-box K having the fire-way $k'$, the chimney H having the stop-gate J, and the shut-off gate E for closing the fire-way leading into the ore-chamber, substantially as and for the purpose set forth.

Witness my hand this 8th day of July, A. D. 1893.

GEORGE M. RICE, 2D.

Witnesses:
CHAS. H. BURLEIGH,
ELLA P. BLENUS.